United States Patent
Bouchard et al.

(10) Patent No.: US 10,344,983 B2
(45) Date of Patent: Jul. 9, 2019

(54) ASSEMBLY OF TUBE AND STRUCTURE CROSSING MULTI CHAMBERS

(71) Applicant: PRATT & WHITNEY CANADA CORP., Longueuil (CA)

(72) Inventors: Guy Bouchard, Mont Saint-Hilaire (CA); Kenneth Parkman, Halton Hills (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/628,257

(22) Filed: Jun. 20, 2017

(65) Prior Publication Data

US 2018/0363913 A1 Dec. 20, 2018

(51) Int. Cl.
*F23R 3/48* (2006.01)
*F23R 3/50* (2006.01)
*F23R 3/26* (2006.01)
*F16C 33/10* (2006.01)
(Continued)

(52) U.S. Cl.
CPC ............... *F23R 3/48* (2013.01); *F01D 25/125* (2013.01); *F01D 25/183* (2013.01); *F02C 7/06* (2013.01);
(Continued)

(58) Field of Classification Search
CPC ............... F16C 33/1025; F16C 33/106; F16C 33/1085; F16C 33/6622; F16C 33/6637; F16C 37/002; F23R 3/26; F23R 3/48; F23R 3/50; F23R 2900/00; F16N 39/00; F16N 2210/12; F01D 1/023; F01D 11/005; F01M 11/02; F01M 9/12; F01M 7/00; F01M 2011/021

USPC ............... 384/311–312, 317, 321–322, 462, 384/471–173, 474; 60/263, 324–494, 60/548, 721, 766, 784; 239/361, 422, 239/428, 533.1; 184/6.11, 39, 546.23, 54, 184/6.23
See application file for complete search history.

(56) References Cited

U.S. PATENT DOCUMENTS 2,565,178 A * 8/1951 Imbert ................. F01D 17/141
                                                              415/126
3,388,778 A * 6/1968 McLean ................... F02C 9/22
                                                              477/170
(Continued)

FOREIGN PATENT DOCUMENTS

GB     840456 A  * 7/1960  ............... F02C 9/16
GB     916692 A  * 1/1963  ............... F02K 9/82
GB    1262690 A  * 2/1972  ............... F01D 11/04

*Primary Examiner* — Marcus Charles
(74) *Attorney, Agent, or Firm* — Norton Rose Fulbright Canada LLP

(57) ABSTRACT

A gas turbine engine comprises bearing(s). A structure supporting the bearing defines a bearing cavity surrounding the at least one bearing, an ambient chamber and an intermediate chamber having a portion between the bearing cavity and the ambient chamber, with at least one wall forming a passage from the bearing cavity to the ambient chamber and through the portion of the intermediate chamber. A tube is received in the passage and having a first end open to the bearing cavity and a second end open to the ambient chamber, the second end adapted to be connected to a conduit for fluid communication between the bearing cavity and the through the tube, wherein a portion of or near the first end of the tube is sealingly joined to the at least one wall, and the second end of the tube contacts the at least one wall and is free to move relative to the at least one wall.

12 Claims, 4 Drawing Sheets

(51) Int. Cl.
  *F16C 37/00* (2006.01)
  *F16N 39/00* (2006.01)
  *F01D 25/12* (2006.01)
  *F01D 25/18* (2006.01)
  *F02C 7/06* (2006.01)
  *F01M 11/02* (2006.01)
  *F01D 1/02* (2006.01)
  *F01D 11/02* (2006.01)

(52) U.S. Cl.
  CPC ........ *F16C 33/106* (2013.01); *F16C 33/1025* (2013.01); *F16C 33/1085* (2013.01); *F16N 39/00* (2013.01); *F23R 3/26* (2013.01); *F23R 3/50* (2013.01); *F01D 1/023* (2013.01); *F01D 11/02* (2013.01); *F01M 2011/021* (2013.01); *F05D 2220/32* (2013.01); *F05D 2230/237* (2013.01); *F05D 2260/941* (2013.01); *F16N 2210/12* (2013.01); *F23R 2900/00* (2013.01)

(56) References Cited

U.S. PATENT DOCUMENTS

| | | | | |
|---|---|---|---|---|
| 3,814,537 A * | 6/1974 | Stoltman | ............... | F02C 9/22 415/160 |
| 3,913,316 A * | 10/1975 | Canale | ............... | F02C 9/28 137/625.64 |
| 4,304,104 A * | 12/1981 | Grose | ............... | F04D 1/12 62/324.2 |
| 4,683,716 A * | 8/1987 | Wright | ............... | F01D 11/22 415/127 |
| 5,186,084 A * | 2/1993 | Totsu | ............... | B23P 19/006 81/431 |
| 5,776,229 A * | 7/1998 | Blanes | ............... | B01D 45/14 55/407 |
| 5,954,035 A * | 9/1999 | Hofer | ............... | F01M 13/04 123/573 |
| 6,102,577 A | 8/2000 | Tremaine | | |
| 6,503,052 B1 * | 1/2003 | Caillet | ............... | F01D 17/14 415/159 |
| 8,002,864 B2 | 8/2011 | Earith et al. | | |
| 2007/0000730 A1 * | 1/2007 | Regonini | ............... | B01D 45/14 184/6.23 |
| 2010/0074762 A1 * | 3/2010 | Liang | ............... | F01D 5/186 416/97 R |
| 2012/0011824 A1 | 1/2012 | Cigal et al. | | |
| 2014/0290972 A1 * | 10/2014 | Robson | ............... | E02D 7/10 173/1 |
| 2015/0330305 A1 * | 11/2015 | Tall, Jr. | ............... | F01D 17/162 415/1 |

* cited by examiner

ASSEMBLY OF TUBE AND STRUCTURE CROSSING MULTI CHAMBERS

TECHNICAL FIELD

The present disclosure pertains to a sealing arrangement for a tube crossing chambers of different pressures, such as in a gas turbine engine.

BACKGROUND OF THE ART

In some mechanical apparatuses, such as gas turbine engines, it may be required to have tubes pass through compartments exposed to different pressures and/or temperatures. Accordingly, various arrangements have been devised to allow such fluid communication through compartments. One known arrangement has oil tubes including seals at interfaces with different cavities (external, buffer and oil). This arrangement may have the weakness of possible leakage at the seals, especially when the surrounding external air temperature is high. Another arrangement has local bridges between the cavities through which the tube passes and brazed at opposite ends. In such an arrangement, thermal stresses/local deformations may be created by the local bridges between a hot external wall and cold internal wall.

SUMMARY

In accordance with a first embodiment of the present disclosure, there is provided an assembly comprising: a structure defining at least a first chamber, a second chamber and a third chamber having a portion between the first chamber and the second chamber, with at least one wall forming a passage from the first chamber to the second chamber and through the portion of the third chamber; and a tube received in the passage and having a first end open to the first chamber and a second end open to the second chamber, the second end adapted to be connected to a conduit for fluid communication between the first chamber through the tube, wherein a portion of or near the first end of the tube is sealingly joined to the at least one wall, and the second end of the tube contacts the at least one wall and is free to move relative to the at least one wall.

In accordance with a second embodiment of the present disclosure, there is provided a gas turbine engine comprising: at least one bearing; a structure supporting the at least one bearing and defining at least a bearing cavity surrounding the at least one bearing, an ambient chamber and an intermediate chamber having a portion between the bearing cavity and the ambient chamber, with at least one wall forming a passage from the bearing cavity to the ambient chamber and through the portion of the intermediate chamber; and a tube received in the passage and having a first end open to the bearing cavity and a second end open to the ambient chamber, the second end adapted to be connected to a conduit for fluid communication between the bearing cavity and the through the tube, wherein a portion of or near the first end of the tube is sealingly joined to the at least one wall, and the second end of the tube contacts the at least one wall and is free to move relative to the at least one wall.

In accordance with a first embodiment of the present disclosure, there is provided a method for forming a fluid communication between chambers of a structure, comprising: obtaining a structure defining at least a first chamber, a second chamber and a third chamber having a portion between the first chamber and the second chamber, with at least one wall forming a passage from the first chamber to the second chamber and through the portion of the third chamber; positioning a tube in the passage such that a first end of the tube is open to the first chamber and a second end of the tube is open to the second chamber, the second end contacting the at least one wall and being free to move relative to the at least one wall; and rigidly and sealingly joining the first end of the tube to the at least one wall, while maintaining the second end free to move relative to the at least one wall.

DESCRIPTION OF THE DRAWINGS

Reference is now made to the accompanying figures in which.

DETAILED DESCRIPTION

Figure 1:
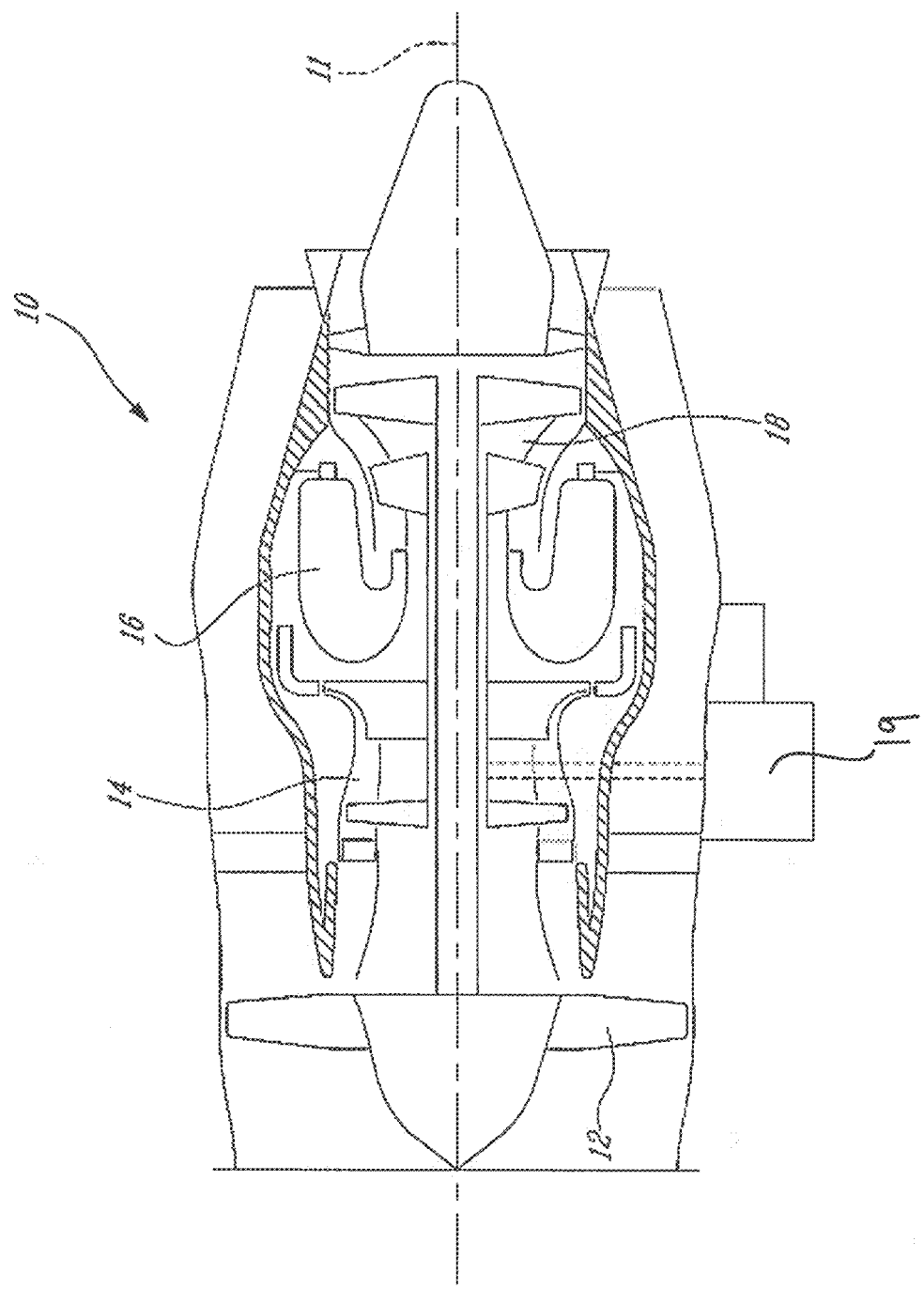
FIG. 1 is a schematic cross-sectional view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. An accessory gearbox 19 may be driven by either one of the compressor 14 and the turbine section 18. In numerous locations of the gas turbine engine 10, bearings support rotating components, such as the turbine shaft, the compressor shaft, and gears and shafts of the gearbox.

Figure 2:
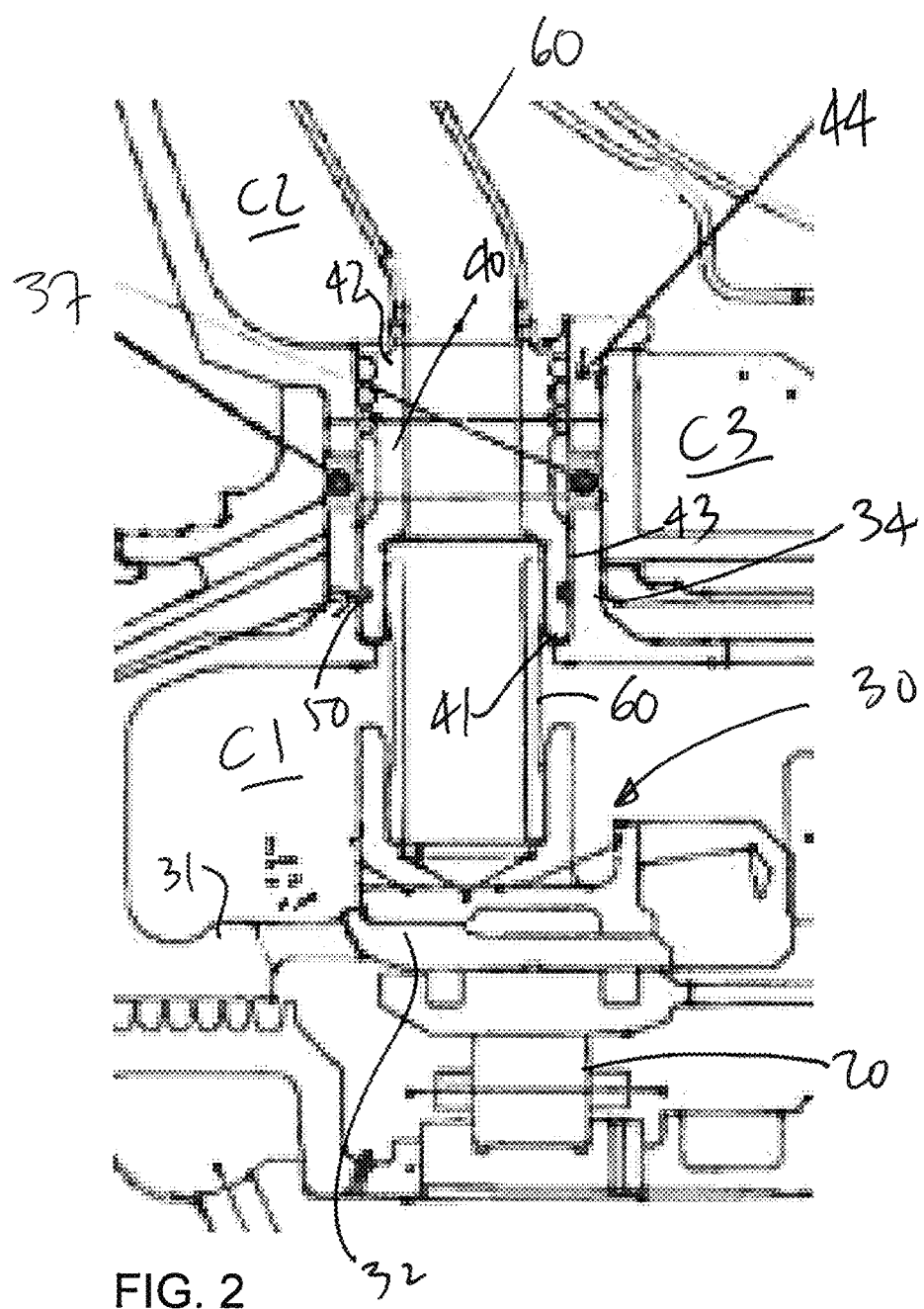
FIG. 2 is a cross-sectional view of an assembly of structure and tube in accordance with the present disclosure.
Figure 3:
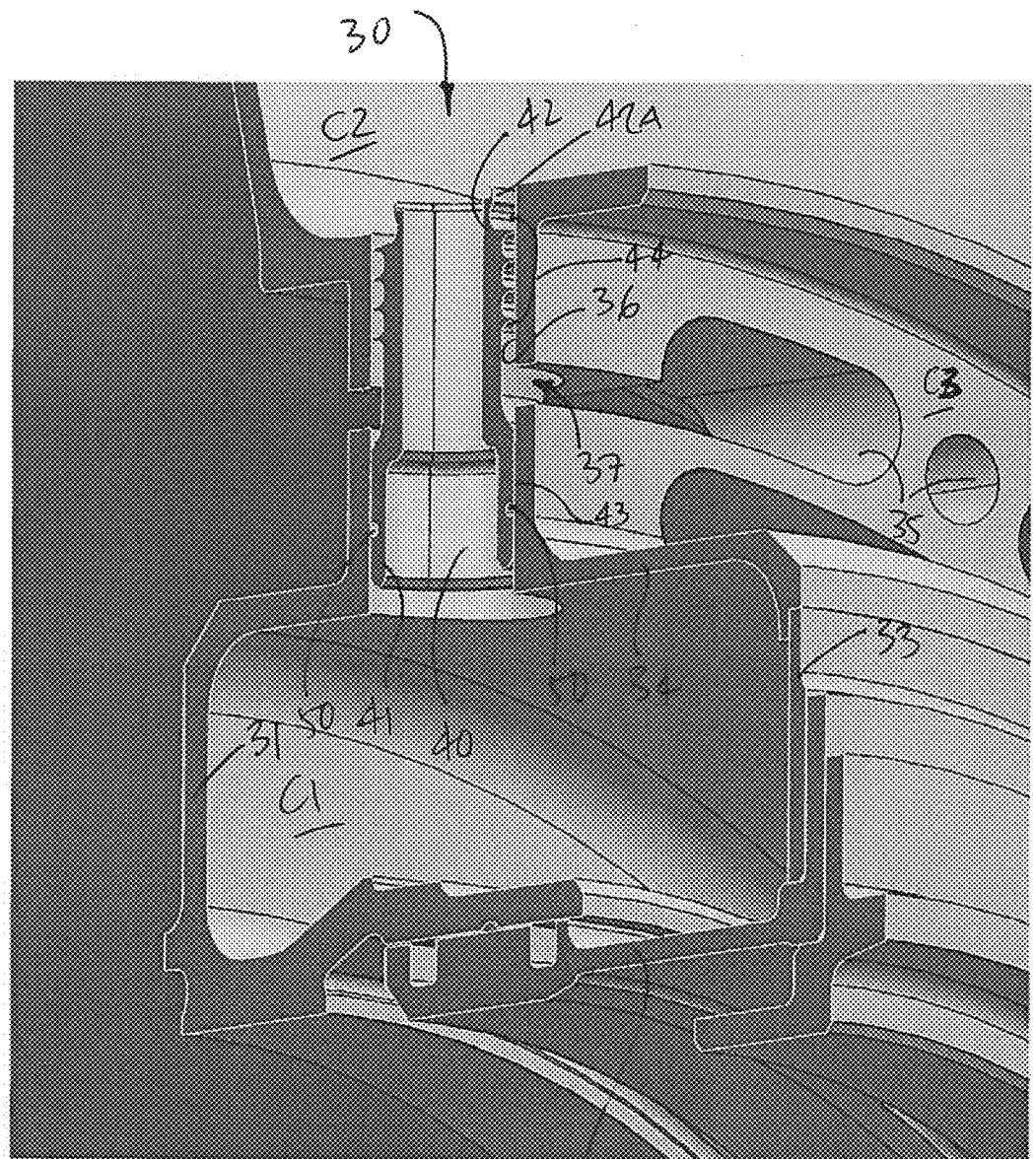
FIG. 3 is a perspective cross-sectional view of the assembly of structure and tube of the present disclosure.
Figure 4:
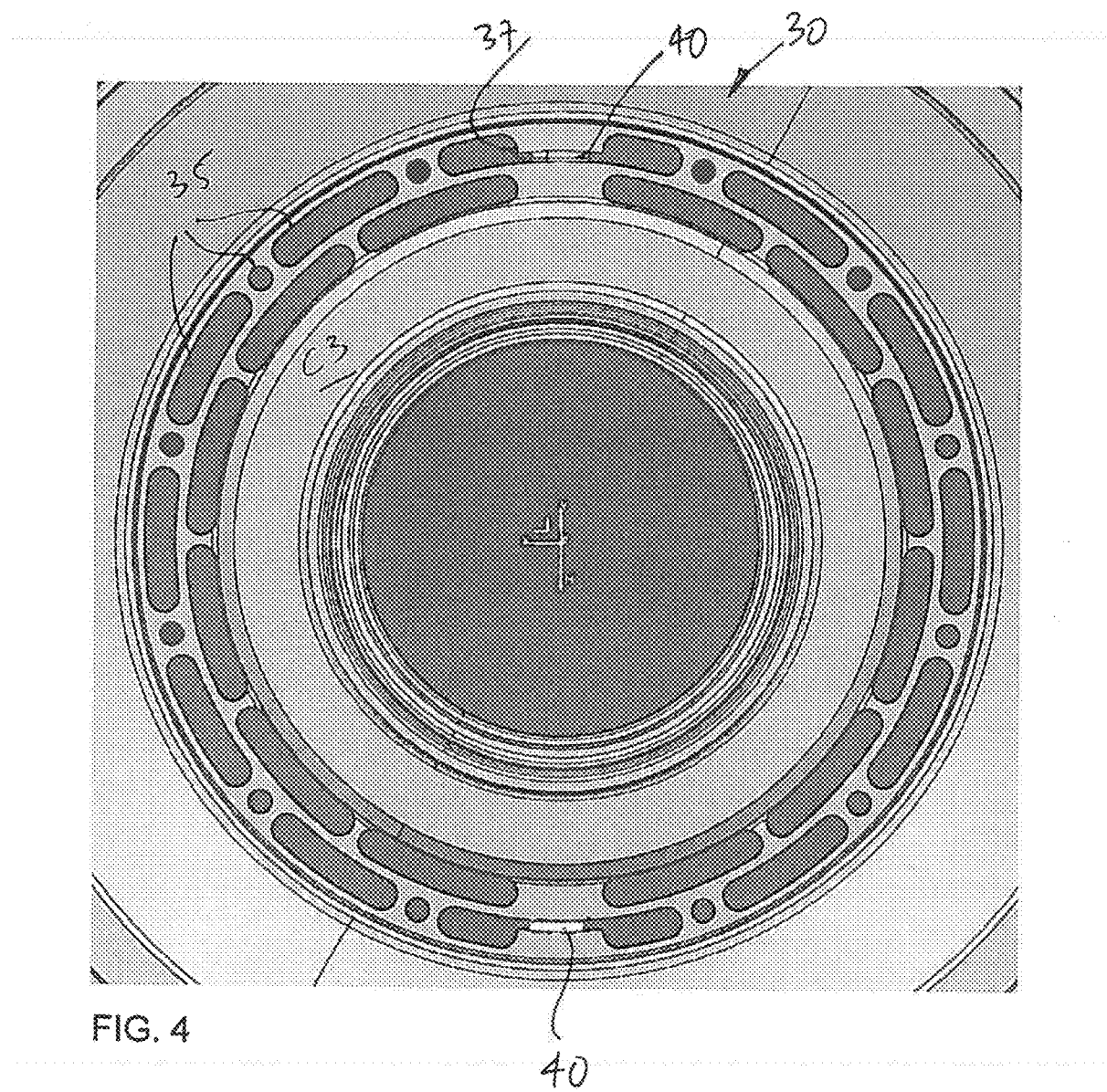
FIG. 4 is an axial view of the assembly of structure and tube of the present disclosure.

Referring to FIGS. 2-4, there is shown one such bearing 20 (FIG. 2), along with a structure 30 supporting the bearing 20. The structure 30 itself may be connected to other structural components of the gas turbine engine 10. The structure 30 may form different cavities operating at different pressures and exposed to different temperatures. For example, the structure 30 may define a first chamber C1, a second chamber C2 and a third chamber or zone C3, also known as an intermediate chamber of cavity(ies) as it is between the chambers C1 and C2. The third chamber C3 may have a portion located between the first chamber C1 and the second chamber C3. The chambers C1-C3 are annular in shape as they surround the bearing 20. The present disclosure pertains to a fluid communication between the first chamber C1 and one or more tubes extending through the second chamber C2, therefore passing through the third chamber C3 as well.

In the illustrated embodiment, in which the structure 30 supports the bearing 20, the first chamber C1 may be a bearing cavity for feeding or scavenging oil to/from the bearing 20. In such an embodiment, C1 operates at a lower pressure and temperature than C2 and C3, and must be sealed from C2 and C3 to prevent and fluid communication with C2 and C3. The second chamber C2 may be an ambient chamber. According to an embodiment, the second chamber C2 is the P3 cavity of the gas turbine engine 10. The P3 cavity is at the final compressor delivery pressure, after the diffuser, and consequently has a high pressure and temperature than C1 and C3. The third chamber C3 may be more than one cavity. The third chamber C3 may include a buffer air cavity, an insulating air cavity, a seal balance air cavity. The third chamber C3 may include P2.9 air (at the static pressure at the exit of the last compressor stage, before the diffuser) in staggered cavities adjacent to C2. Accordingly, the zone C3 maintains a pressure or pressures during operation that are between those of cavities C1 and C2, i.e., lower than C2 but higher than C1. The structure 30 may have other functions, and is therefore not limited to supporting a bearing, nor is it limited to defining annular cavities/chambers.

The structure 30 has one or more walls to define the cavities C1, C2 and C3. In the illustrated embodiments, the structure 30 has walls 31, 32, 33 and 34, although fewer or more walls may be present. The walls 31-34 may be made of any appropriate material, such as metal, and are machined in any appropriate way to be shaped in the manner shown in FIGS. 2-4. Moreover, other components may be present, such as seals, fasteners, etc. The first chamber C1 is concurrently defined by the walls 31-34. The bearing 20 may thus be supported for example by the walls 31 and 32. Hence, although the expression wall is used, item 32 may also be regarded as a support beam for the bearing, with the support beam 32 being supported by the wall 33. In the illustrated embodiment, the walls 31 and 34 project radially upwardly, relative to the bearing 20, to also define a portion of the second chamber C2 and third chamber C3 (including its numerous cavities if present). The walls 31 and 34 may also be integrally connected to form a single monoblock component as well. However, in another embodiment, the second chamber C2 and third chamber C3 may have dedicated walls.

The walls 31 and 34 may define axial slots 35 in the third chamber C3 to allow fluid passage therethrough. Such axial slots 35 may be circumferentially distributed around the structure 30, so as to allow fluid communication around the structure 30 in C3 while allowing the distribution of bearing loads by the structure 30. The fluid communication between the first chamber C1 and the second chamber C2 is through passage 36, passing through the third chamber C3. The passage 36 is shown at a single location in FIG. 3, but there may be more than one such passage 36 in the gas turbine engine 10, as shown in FIG. 4, with one passage 36 being for scavenging oil and another passage for supplying oil to the first chamber C1. In the illustrated embodiment, the passage 36 is concurrently defined by the walls 31 and 34. As also observed, the passage 36 may have a cylindrical geometry, although other geometries are considered as well. The passage 36 may be defined by a single wall, or more than one wall as shown by the walls 31 and 34. The passage 36 may have an undisrupted cylindrical geometry, but may also be disrupted by an opening 37 creating fluid communication between the passage 36 and the cavity C3. The opening 37 breaks a thermal stress that may be caused by the higher temperature of C2 relative to C1 and C3.

Still referring concurrently to FIGS. 2-4, a tube 40 (e.g., a metallic tube) is positioned in the passage 36, to establish fluid communication between the cavities C1 and C2, while isolating the cavity C3 from the fluid communication. The tube 40 has a first end 41 open to the cavity C1, and a second end 42 open to the cavity C2, for connection to a tube that will be isolated from cavity C2, such as an oil tube. Connectors may be present at the ends 41 and 42, such as the flange 42A by which the tube 40 may be connected to an oil tube. For instance, the connector at 42A may also include threading, barbs, etc., to form a seal-tight connection with an oil tube. Moreover, although the tube 40 is shown as being relatively flush with the wall 34 of C3, it may extend beyond it to connect to an oil tube. An outer surface of the tube 40 may have generally cylindrical outer surface, or any other shape complementary to that of the passage 36, as the tube 40 is inserted in the passage 36 such that there is limited or no play, as will be described in further detail hereinafter. At or adjacent to the first end 41, the tube 40 may define an enlarged outer surface portion 43, with a step then formed toward the second end 42, for a portion of the tube 40 at or adjacent to the second end 42 to be narrower than the enlarged outer surface portion. This is one possible configuration, as it is also contemplated to provide the tube 40 with a constant cross-sectional dimension as well. Projections 44 are formed on the outer surface of the tube 40, adjacent to or at the second end 42. The projections 44 may be integrally formed with the tube 40, in that the tube 40 and projections 44 are a monolithic (a.k.a., monoblock) piece. According to an embodiment, the projections 44 are annular fins that taper away from the outer surface of the tube 40, with four such fins shown in FIG. 3, although fewer or more fins may be present. According to an embodiment, the annular fins are radially oriented relative to a central axis of the tube 40. According to another embodiment, an outer diameter of the fins 44 is equal to an outer diameter of the enlarged outer surface portion 43.

The tube 40 is sealingly joined to the inner surface of the passage 36. Stated differently, the expression "joined" refers to a permanent joining of the structure 30 and the tube 40. In the illustrated embodiment, brazing joint 50 sealingly and rigidly joins the tube 40 to the structure 30, but other types of permanent joining may be used as well, such as soldering, welding, permanently adhering, etc. Accordingly, the first end 41 of the tube 40 is fixed or anchored to the structure 30. The second end 42 is not sealingly joined to the inner surface of the passage 36. The second end 42 is voluntarily kept free to move relative to the passage 36, although it is sized to contact an inner surface of the passage 36. In the illustrated embodiment, the contact is made by way of the projections 44. In another embodiment, in which the tube 40 does not have projections 44, an outer surface of the tube 40 is in contact with the inner surface of the passage 36, the contact nonetheless allowing translational movement of the tube 40 radially outward of the brazing 50, relative to the passage 36. In other words, beyond the brazing 50, the tube 40 may move independently from the wall(s) of the passage 36.

The cavities C1, C2 and C3 are typically exposed to different pressures and temperatures. Due to different thicknesses, geometries, materials, the expansion or contraction may differ between the walls of the structure 30 and the tube 40. While the materials are generally common, there is significant delta in expansion due to the significant temperature delta between C1 and C2. The absence of permanent joining at the second end 42 therefore allows a freedom of movement of a portion of the tube 40, and thus reduces or eliminates any stress at the second end 42 of the tube 40, or on the inner surface of the passage 36 opposite the second end 42 of the tube 40. Such a stress may be the result of the higher temperature in C2. The tube 40 is dimensioned and manufactured in such a way that there is limited or no gap between the second end 42 of the tube 40 and the inner surface of the passage 36. The fins 44 on the tube 40 mate with the inner surface of the passage 36 with a very small clearance. For example, the projections 44 may form a labyrinth seal that limits air leakage between the second end 42 of the tube 40 and the inner surface of the passage 36. Some limited leakage may be allowed. The inner surface of the passage 36 could also be provided with projections, i.e., inward projections, in lieu of or complementary to the projections 44 of the tube 40. Accordingly, a static labyrinth seal is essentially formed with projections of adequate length, the projections being in contact or in close proximity to the inner surface of the tube 40.

In such an arrangement, the opening 37 exposes a portion of the outer surface of the tube 40 to C3 pressure and temperature. The opening 37 breaks the bridge between the hot external walls 31 and 34 of the passage 36, and the colder tube 40, exposed to cooling oil in the case of the bearing cavity C1. When the structure 30 supports a bearing 20, the structure 30 as described above forms a bearing compartment located in a low temperature and pressure environment, that is isolated from the thermal stresses of C2 and bearing/seals support structure distortions, due to the freedom of movement of the second end 42 of the tube 40. The present disclosure also pertains to a method for forming a fluid communication between chambers of the structure 30, in which a user may obtain the structure 30 defining the first chamber C1, the second chamber C2 and a third chamber C3 having a portion between the first chamber C1 and the second chamber C2. One or more walls 31, 34 form passage 36 from the first chamber C1 to the second chamber C2 and through the portion of the third chamber C3. The tube 40 is positioned in the passage 36 such that the first end 41 of the tube 40 is open to the first chamber C1 and a second end 42 of the tube 40 is open to the second chamber C2 for fluid communication between the first chamber C1 and a tube, conduit or pipe passing through the second chamber C2, the second end 42 contacting the wall(s) 31, 34 and being free to move relative thereto. The first end 41 of the tube 40 is sealingly and rigidly joined to the wall(s) 31, 34, while maintaining the second end 42 free to move relative to wall(s) 31,34.

As observed in FIG. 2, additional tubes, pipes or conduits 60 may be connected to the tube 40. In the present disclosure, the tubes 60 may feed/scavenge oil to/from the bearing cavity C1. The cavity C1 is in a "low" air temperature and pressure environment. The tube 40 is permanently attached (brazed) to or close to the bearing oil cavity C1 to limit or eliminate any possible oil leakage. The bearing cavity C1 is surrounded by the chamber C3 (buffer air, insulating air, seal balance air, P2.9 air in staggered cavities) that provides air pressurization for the static seal, the buffer air chamber C3 operating at a lower pressure than the ambient pressure C2 outside the buffer air chamber C3.

The new arrangement enables the tubes 40 and 60 to cross the buffer air chamber wall with very small amount of air leakage between the external high pressure and the lower pressure buffer air pressure. C2 is the highest pressure cavity. The arrangement described above minimizes the leakage of air from C2 into the intermediate cavities of C3 while also minimizing the thermal stress from the high temperature difference between C1 and C2.

The above description is meant to be exemplary only, and one skilled in the art will recognize that changes may be made to the embodiments described without departing from the scope of the invention disclosed. The brazing 50 is said to be at the first end 41, namely at a portion of the tube 40 at or near the first end 41. A controlled leakage path is formed between the second end 42 and the passage 37 for air to flow from C2 to C3, with a discontinuity in the passage 37 against thermal stress transfer. Still other modifications which fall within the scope of the present invention will be apparent to those skilled in the art, in light of a review of this disclosure, and such modifications are intended to fall within the appended claims.

The invention claimed is:

1. An assembly comprising:
 a structure defining at least a first chamber, a second chamber and a third chamber having a portion between the first chamber and the second chamber, with at least one wall forming a passage from the first chamber to the second chamber and through the portion of the third chamber; and
 a tube received in the passage and having a first end open to the first chamber and a second end open to the second chamber, the second end adapted to be connected to a conduit for fluid communication between the first chamber through the tube, wherein a first end portion of the tube is sealingly joined to the at least one wall, and the second end of the tube contacts the at least one wall and is free to move relative to the at least one wall.

2. The assembly according to claim 1, further comprising a brazing joint between the first end portion of the tube and the at least one wall.

3. The assembly according to claim 1, wherein the at least one wall and the tube are made of metal.

4. The assembly according to claim 1, further comprising an opening in the at least one wall for fluid communication between the passage and the third chamber, whereby an outer surface of the tube between the first end and the second end is exposed to a pressure of the third chamber.

5. The assembly according to claim 1, wherein the second end of the tube has at least one contact member integral with the tube and projecting from an outer surface thereof, the at least one contact member contacting the at least one wall to form a labyrinth seal.

6. The assembly according to claim 5, wherein the at least one contact member is at least one radial fin.

7. The assembly according to claim 1, wherein the third chamber is a low-pressure chamber relative to the first chamber and the second chamber.

8. A method for forming a fluid communication between chambers of a structure, comprising:
 obtaining a structure defining at least a first chamber, a second chamber and a third chamber having a portion between the first chamber and the second chamber, with at least one wall forming a passage from the first chamber to the second chamber, the at least one wall defining an opening into the portion of the third chamber;
 positioning a tube in the passage such that a first end of the tube is open to the first chamber and a second end of the tube is open to the second chamber, the second end contacting the at least one wall and being free to move relative to the at least one wall; and
 rigidly and sealingly joining the first end of the tube to the at least one wall, while maintaining the second end free to move relative to the at least one wall.

9. The method according to claim 8, wherein rigidly and sealing joining the first end of the tube to the at least one wall comprises brazing the first end of the tube to the at least one wall.

10. The method according to claim 8, wherein positioning the tube in the passage includes forming a labyrinth seal by having at least one contact member integral to the tube and projecting from an outer surface thereof contacting the at least one wall.

11. The method according to claim 8, wherein positioning the tube in the passage includes exposing an outer surface of the tube between the first end and the second end to a pressure of the third chamber through an opening in the at least one wall.

12. The method according to claim 8, further comprising connecting a conduit to the second end of the tube, the conduit extending through the second chamber.

\* \* \* \* \*